March 25, 1958     E. A. KERSHAW     2,827,949
SWING SEAT
Filed Jan. 4, 1954
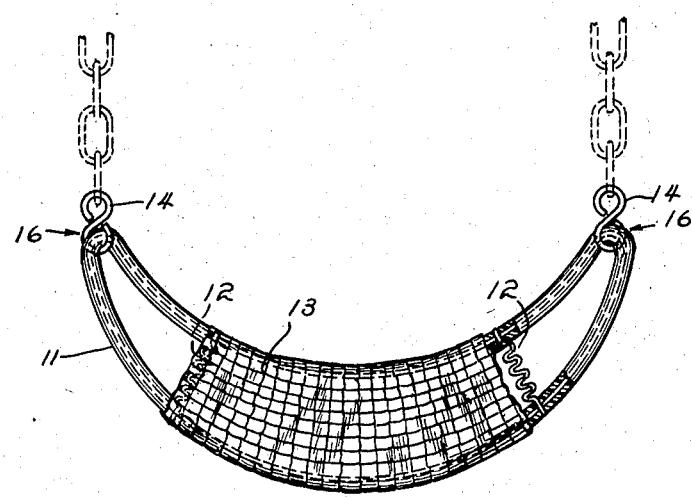
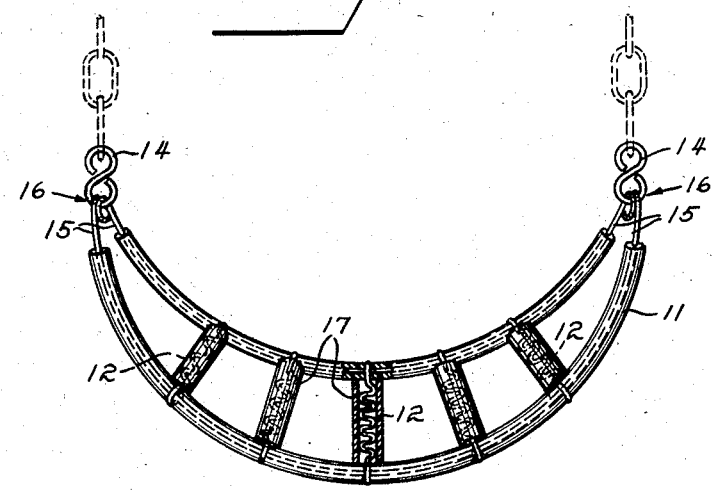
INVENTOR.
EDWARD A. KERSHAW
BY
ATTORNEY

2,827,949
// SWING SEAT

Edward A. Kershaw, Henderson, Ky.

Application January 4, 1954, Serial No. 402,016

2 Claims. (Cl. 155—58)

This invention relates to swing seats adapted either for home or playground use.

An object of this invention is to produce a safer swing seat by reducing the chance of injury in case a small child should be struck by a user.

A further object of this invention is to produce a simple and inexpensive swing seat of improved construction.

Figure 1 is a perspective view of the swing seat specially adapted for home use.

Figure 2 is a perspective view of the swing seat adapted for use on playgrounds or public places where vandalism presents a problem of maintenance.

Referring to the drawings, in Figure 1 11 indicates a rubber frame of quarter moon shaped construction which forms the foundation for the swing seat. The frame may be made from used tire bead or extruded rubber and in the preferred embodiment the frame is constructed from rubber covered steel wire rope. The term "rubber" as used herein is intended to include the elastic natural rubber and synthetic rubber substitutes therefor. In one embodiment, the bottom section is generally rectangular in shape, 10 inches in length and varying in width from about 8½ inches at a point nearest the ends 16 to about 10 inches at the center of the cover.

A top section is similarly proportioned and the two sections are superposed over frame 11 and spring wire supporting members 12 and stitched together on the four sides to form a snug fit cover. Alternatively, in a preferred modification the top section may have end flaps measuring about 4 inches in length and about 5½ inches in width. These end flaps facilitate the covering of the load supporting members 12 and are conveniently sewn or stitched to the bottom section.

Construction of frame

The rubber covered wire rope raw material consists of approximately 40 coils of 50 mil spring steel wire embedded in rubber. A continuous hoop 11 is folded to form two half hoops approximately 16 to 20 inches in diameter compressed in a vise or press and then allowed to spring out to a quarter moon shape.

Figure 2 shows an alternative construction made from two semicircles of wire reinforced rubber rope with an extension 15 of wire or plastic at the ends of the semicircle for purposes of attachment to suspension members. In the plastic embodiment of extension 15, any conventional means may be used to attach 15 to hoop 11. For example, a braided nylon or Orlon rope may be fastened to the wire or wire rope 11 by a knot. The wire portion, as illustrated in Figure 2 may be conveniently hooked.

Home construction

Spring wire seat or load supporting members 12 approximately 6 inches in length are spaced 5 to 8 inches from each end 16 of the full or half hoop and has its ends clamped in that position on the hoop 11.

A woven plastic cover 13 is made in two sections proportioned suitably to fit over and around the spring wire or zigger wires 12 to form the actual seat covering.

S-hooks 14 of stock approximately 3/16 inch in diameter with one inch eyes are positioned at ends 16 to form suspension members for the swing seat.

With further reference to Figure 1 the springs 12 may be omitted in which case the plastic cover 13 serves as the only load supporting member.

Playground construction

In the modified construction shown in Figure 2, additional spaced spring wires 12 are positioned on hoop 11 between end points 16 and each spring wire is covered or sheathed individually with a woven plastic cover 17. In this adaptation for use on playgrounds or public places where vandalism might present a problem, the individually covered spring forms the seat support for the swing user.

With further reference to Figure 2, whereas the preferred embodiment discloses a woven plastic cover 17 (see also 13 of Figure 1) various well known alternative materials such as leather, or other natural fabrics, etc., may be used.

I claim:

1. A swing seat comprising a generally quarter moon shaped frame of rubber covered wire, spring wire load supporting means transversely disposed within said frame along the major axis and attached thereto, a woven plastic sheath covering said load supporting means and members attached at each end of said frame for suspension.

2. A swing seat comprising a generally quarter moon shaped frame of rubber covered wire, spring wire load supporting means transversely disposed within said frame along the major axis and attached thereto, a woven plastic sheath individually enclosing each spring wire load supporting means and members attached at each end of said frame for suspension.

References Cited in the file of this patent

UNITED STATES PATENTS

| 15,021 | Spooner | June 3, 1856 |
| 1,453,942 | Mills | May 1, 1923 |
| 1,975,262 | Evans | Nov. 2, 1934 |
| 2,645,540 | Trimble | July 14, 1953 |

FOREIGN PATENTS

| 316,201 | Great Britain | July 25, 1929 |
| 371,706 | Germany | Mar. 17, 1923 |